(12) United States Patent
Kim et al.

(10) Patent No.: US 10,816,854 B2
(45) Date of Patent: Oct. 27, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Dong-Hwi Kim, Paju-si (KR); Ki-Seong Kim, Paju-si (KR); Ji-Seok Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/223,715

(22) Filed: Dec. 18, 2018

(65) Prior Publication Data

US 2019/0187519 A1 Jun. 20, 2019

(30) Foreign Application Priority Data

Dec. 20, 2017 (KR) .................. 10-2017-0175652

(51) Int. Cl.
G02F 1/13357 (2006.01)
F21V 8/00 (2006.01)

(52) U.S. Cl.
CPC ...... *G02F 1/133611* (2013.01); *G02B 6/0036* (2013.01); *G02B 6/0045* (2013.01); *G02F 1/133603* (2013.01); *G02F 1/133605* (2013.01); *G02F 1/133606* (2013.01); *G02F 2001/133614* (2013.01)

(58) Field of Classification Search
CPC ......... G02F 1/133606; G02F 1/133603; G02F 1/133504; G02F 1/133611; G02B 6/0051; G02B 6/0045; G02B 6/0036
See application file for complete search history.

(56) References Cited

U.S. PATENT DOCUMENTS

| | | | |
|---|---|---|---|
| 7,677,749 B2* | 3/2010 | Chang | G02B 5/0278 362/612 |
| 2011/0050735 A1* | 3/2011 | Bae | G02F 1/133603 345/690 |
| 2014/0029238 A1* | 1/2014 | Ito | F21V 9/00 362/84 |
| 2016/0259209 A1* | 9/2016 | Ito | G02B 5/0278 |

* cited by examiner

*Primary Examiner* — Jessica M Merlin
(74) *Attorney, Agent, or Firm* — Morgan, Lewis & Bockius LLP

(57) ABSTRACT

A backlight unit includes a diffusion plate, wherein the diffusion plate includes a first region along edges of the diffusion plate, and a second region surrounded by the first region, and wherein a thickness of the first region decreases toward an outer side direction of the diffusion plate.

16 Claims, 8 Drawing Sheets

BACKLIGHT UNIT AND LIQUID CRYSTAL DISPLAY DEVICE INCLUDING THE SAME

CROSS REFERENCE TO RELATED APPLICATIONS

The present application claims the priority benefit of Korean Patent Application No. 10-2017-0175652 filed in Republic of Korea on Dec. 20, 2017, which is hereby incorporated by reference in its entirety for all purposes as if fully set forth herein.

BACKGROUND

Technical Field

The present disclosure relates to a backlight unit and a liquid crystal display device including the same.

Discussion of the Related Art

Facing information society, needs for display devices have increased variously. Recently, flat display devices, such as a liquid crystal display (LCD) device, a plasma display panel (PDP) device, and an organic light emitting diode (OLED) display device, are used.

Among these display devices, LCD devices are widely used because of advantages in a lightweight, a thin profile, a low power consumption and the like. The LCD device includes a liquid crystal panel, and a backlight unit below the liquid crystal panel.

The backlight unit is categorized into a side edge type backlight unit and a direct type backlight unit.

The direct type backlight unit is configured such that a plurality of light sources are arranged directly below the liquid crystal panel and thus supply a light to the liquid crystal panel. The direct type backlight unit improves uniformity and brightness of a light supplied to the liquid crystal panel and realizes a local dimming, and thus reduces a power consumption.

However, as a thickness of the LCD device is reduced, a thickness of the backlight unit is also reduced and thus an optical gap is reduced. Accordingly, a light is not diffused sufficiently to edge portions of the LCD device.

Therefore, a dark portion happens at the edge portions, and a uniformity of brightness is reduced.

SUMMARY

Accordingly, embodiments of the present disclosure are directed to a backlight unit and a liquid crystal display device that substantially obviate one or more of the problems due to limitations and disadvantages of the related art.

An aspect of the present disclosure is to provide a backlight unit and an LCD device including the same that can prevent a dark portion at edge portions and improve a uniformity of brightness.

Additional features and aspects will be set forth in the description that follows, and in part will be apparent from the description, or may be learned by practice of the inventive concepts. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a backlight unit comprises a diffusion plate, wherein the diffusion plate includes a first region along edges of the diffusion plate, and a second region surrounded by the first region, and wherein a thickness of the first region decreases toward an outer side direction of the diffusion plate.

In another aspect, a backlight unit comprises a diffusion plate, wherein the diffusion plate includes a first region along edges of the diffusion plate, and a second region surrounded by the first region, and wherein the first region includes a plurality of through-holes, a density of which increases toward an outer side direction of the diffusion plate.

In another aspect, a backlight unit comprises a diffusion plate, wherein the diffusion plate includes a central portion, and an edge portion surrounding the central portion, and wherein a part of the edge portion is removed such that a transmittance of the edge portion is greater than that of the central portion.

In another aspect, a liquid crystal display (LCD) device comprises: a liquid crystal panel; and a backlight unit below the liquid crystal panel, the backlight unit including: a diffusion plate including a first region along edges of the diffusion plate, and a second region surrounded by the first region, wherein a thickness of the first region decreases toward an outer side direction of the diffusion plate; a plurality of light emitting diode (LED) packages on a top surface of a circuit board; an encapsulation layer located on the circuit board, and covering the plurality of LED packages; a reflective pattern sheet located on the encapsulation layer and the diffusion plate, and including a plurality of reflective patterns respectively corresponding to the plurality of LED packages; an optical sheet on the diffusion plate; and a fluorescent sheet between the diffusion plate and the optical sheet or between the diffusion plate and the reflective pattern sheet.

In another aspect, a liquid crystal display (LCD) device comprises: a liquid crystal panel; and a backlight unit below the liquid crystal panel, the backlight unit including: a diffusion plate including a first region along edges of the diffusion plate, and a second region surrounded by the first region, wherein the first region includes a plurality of through-holes, a density of which increases toward an outer side direction of the diffusion plate; a plurality of light emitting diode (LED) packages on a top surface of a circuit board; an encapsulation layer located on the circuit board, and covering the plurality of LED packages; a reflective pattern sheet located on the encapsulation layer and the diffusion plate, and including a plurality of reflective patterns respectively corresponding to the plurality of LED packages; an optical sheet on the diffusion plate; and a fluorescent sheet between the diffusion plate and the optical sheet or between the diffusion plate and the reflective pattern sheet.

In another aspect, a liquid crystal display (LCD) device comprises: a liquid crystal panel; and a backlight unit below the liquid crystal panel, the backlight unit including: a diffusion plate including a central portion, and an edge portion surrounding the central portion, wherein a part of the edge portion is removed such that a transmittance of the edge portion is greater than that of the central portion; a plurality of light emitting diode (LED) packages on a top surface of a circuit board; an encapsulation layer located on the circuit board, and covering the plurality of LED packages; a reflective pattern sheet located on the encapsulation layer and the diffusion plate, and including a plurality of reflective patterns respectively corresponding to the plurality of LED packages; an optical sheet on the diffusion plate;

and a fluorescent sheet between the diffusion plate and the optical sheet or between the diffusion plate and the reflective pattern sheet.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Reference will now be made in detail to embodiments, examples of which are illustrated in the accompanying drawings. The same reference numbers may be used throughout the drawings to refer to the same or like parts.

First Embodiment

Figure 1:
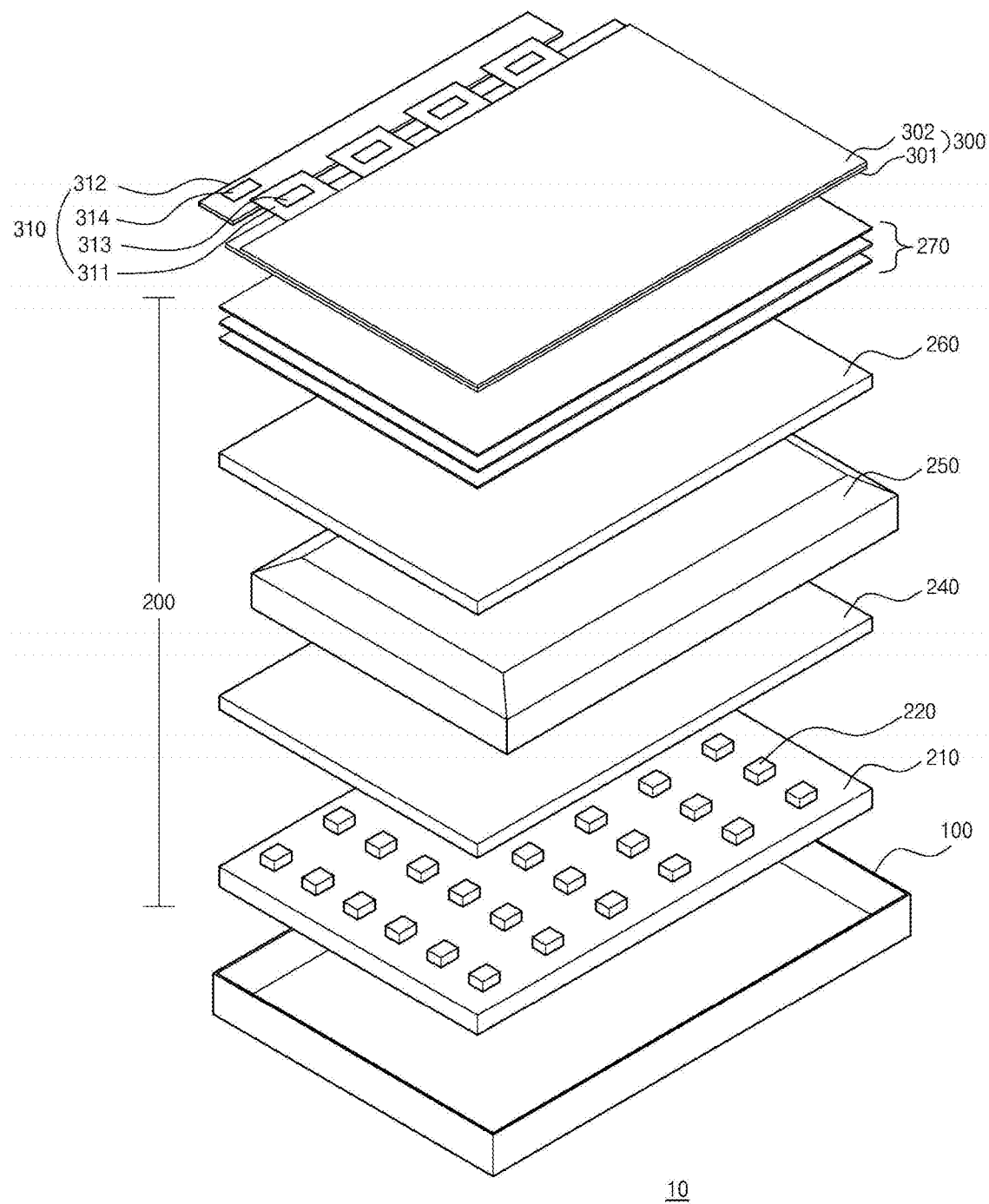
FIGS. 1 and 2 are an exploded perspective view and a cross-sectional view, respectively, schematically illustrating a backlight unit and an LCD device including the same according to a first embodiment of the present invention.
Figure 2:
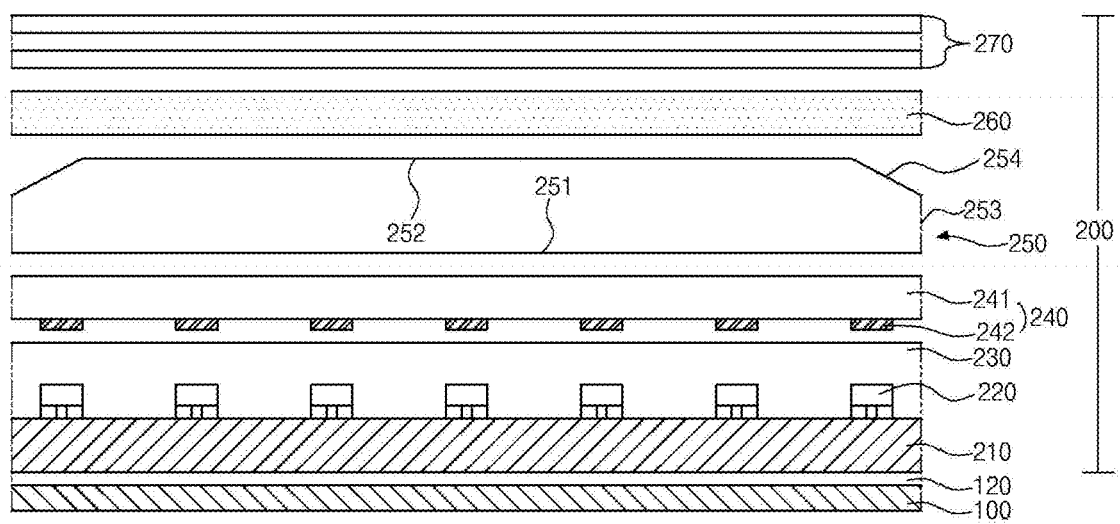

FIGS. 1 and 2 are an exploded perspective view and a cross-sectional view, respectively, schematically illustrating a backlight unit and an LCD device including the same according to a first embodiment of the present invention.

With reference to FIGS. 1 and 2, an LCD device 10 of this embodiment includes a backlight unit 200, a liquid crystal panel 300, a panel driving circuit 310, a bottom cover 100.

The bottom cover 100 is located below, and support, the backlight unit 200. The bottom cover 100 may serve as a component included in the backlight unit 200.

The bottom cover 100 may be formed in a box shape as its top being open to receive the backlight unit 200 inside it. However, the bottom cover 100 may be formed in other configuration, for example, in a plate shape.

Even though not shown in the drawings, the LCD device 10 may include a guide panel that surrounds and supports a side of the backlight unit 200 and the liquid crystal panel 300, and a top cover that covers edges of a top surface of the liquid crystal panel 300.

The backlight unit 200 is a direct type backlight unit, in which a plurality of light sources, for example, light emitting diodes (LEDs) spaced part from each other are arranged below, and face, the liquid crystal panel 300.

The backlight unit 200 may include a circuit board 210, a plurality of LED packages 220, an encapsulation layer (or encapsulation mold) 230, a reflective pattern sheet 240, a diffusion plate 250, a fluorescent sheet 260 and an optical sheet 270.

The circuit board 210 is located on a top surface of the bottom cover 100. The circuit board 210 may be attached to the bottom cover 100 through an adhesive 120 such as a double-sided adhesive tape.

The plurality of LED packages 220 are mounted on a top surface of the circuit board 210. The top surface of the circuit board 210 may have a reflection property, for example, a reflection film may be formed at the top surface of the circuit board 210. In this case, a light is reflected by the circuit board 210 and then travels toward the liquid crystal panel 300.

The LED package 220 emits a light by a driving signal supplied from a backlight driving portion.

The LED package 220 may have various structures. For example, the LED package 220 may have a lateral chip structure, flip chip structure, vertical chip structure, chip scale package (CSP) structure, or the like.

Among the structures, the CSP structure is configured to include an LED chip and a mold enclosing the LED chip, and in this case, a size of the LED package 220 can be minimized and a thickness of the backlight unit 200 can be reduced accordingly.

An encapsulation layer 230 may be located on, and entirely cover, a top surface of the circuit board 210 having the LED packages 220 mounted. The encapsulation layer 230 may be coated at a thickness that is greater than that of the LED package 220 to cover all LED packages 220 mounted on the circuit board 210. The encapsulation layer 230 may serve to stably fix the LED package 220 onto the circuit board 210 and protect the LED package 220 from the outside.

The encapsulation layer 230 may be made of a resin based material including, for example, one or combination of Si, UV resin, PC and PMMA.

The diffusion plate 250 is located on the encapsulation layer 230.

The diffusion plate 250 serves to diffuse a light from the LED packages 220 and supply a uniform plane light to the liquid crystal panel 300.

In this embodiment, the diffusion plate 250 may be configured to include edge portions (or edge regions), and an inner portion (inner region) which is located inside the edge portions, and the edge portions may have a thickness (or height) less than that of the inner portion.

Accordingly, a transmittance of the edge portions can be improved (or increase). Therefore, a phenomenon that dark portions happen along edge portions of the LCD device 10 can be prevented or reduced, and thus a reduction of a uniformity of brightness caused by the dark portions can be improved.

Detailed structure and function of the diffusion plate 250 are explained later.

The reflective pattern sheet 240 may be located below the diffusion plate 250, e.g., located on a bottom surface of the diffusion plate 250. The reflective pattern sheet 240 may include a base layer 241, and a plurality of reflective patterns 242 that are formed on a bottom surface of the base layer 241 and are arranged to correspond to the plurality of LED packages 220, respectively.

The reflective pattern 242 serves to reflect, and distribute in a side direction (or lateral direction), a part of a light upwardly emitted from the LED package 220 therebelow, and to transmits a remaining part of the light upwardly emitted from the LED package 220.

Accordingly, most of the light traveling in an upwardly vertical direction then being incident on the liquid crystal panel 300 can be prevented. Thus, an occurrence of a hot spot caused by a light incidence in a upwardly vertical direction can be prevented, and a reduction of a display quality can be prevented. As such, the reflective pattern 242 may function as a light-blocking pattern to partially block the light traveling in an upwardly vertical direction.

The fluorescent sheet 260 may be located on the diffusion plate 250. Alternatively, the fluorescent sheet 260 may be located below the diffusion plate 250, e.g., located between the diffusion plate 250 and the encapsulation layer 230.

The fluorescent sheet 260 may include at least one fluorescent substance that absorbs a part of a light of first color produced by the LED package 220 and makes at least one color that is different from the first color.

In case of using the fluorescent sheet 260, a light of the first color produced by the LED package 220 and a light of the color produced by the fluorescent sheet 260 are mixed to finally form a white light, and the white light is supplied to the liquid crystal panel 300.

For example, when the LED package 220 produces a blue light as the first color light, the fluorescent sheet 260 may absorb a part of the blue light and produce a yellow light as a second color light.

Alternatively, when the LED package 220 produces a white light, the fluorescent sheet 260 may be eliminated.

At least one optical sheet 270 including a light-concentrating sheet may be located on the fluorescent sheet 260. In this embodiment, three optical sheets 270 are shown by way of example. Alternatively, in a case that the fluorescent sheet 260 is located below the diffusion plate 250, the optical sheet 270 may be located on the diffusion plate 250.

The liquid crystal panel 300 is located on the backlight unit 200.

The liquid crystal panel 300 as a display panel adjusts a transmissivity of a liquid crystal layer therein to display images. The liquid crystal panel 300 may include a first substrate (or a lower substrate) 301, and a second substrate (or an upper substrate) 302 facing the first substrate 301, and a liquid crystal layer between the first and second substrates 301 and 302. Even though not shown in the drawings, a first polarization plate and a second polarization plate may be attached to an outer surface of the first substrate 301 and an outer surface of the second substrate 302, respectively.

In the liquid crystal panel 300, a liquid crystal layer of each pixel is operated by an electric field produced by a data voltage and a common voltage applied to each pixel, and according to a transmissivity of the liquid crystal layer, a color image can be displayed.

The panel driving circuit 310 may be connected to a pad portion of the first substrate 301 and operate each pixel of the liquid crystal panel 300.

For example, the panel driving circuit 310 may include a plurality of circuit films 311 connected to the pad portion of the liquid crystal panel 300, a data IC 313 mounted on each circuit film 311, a display printed circuit board 312 connected to the circuit films 311, and a timing control circuit 314 mounted on the display printed circuit board 312.

The timing control circuit 314 may sort and process digital image data input from an external driving system to produce pixel data for respective pixels of the liquid crystal panel 300, in response to timing signals supplied from the external driving system, and supply the pixel data to the data IC 313.

Further, the timing control circuit 314 may produce a data control signal and a gate control signal based on the timing signals, and supply the data control signal and the gate control signal to the data IC and a gate IC, respectively.

Further, the timing control circuit 314 may control an emission operation of the backlight unit 200 according to a local dimming method, and individually control a brightness of the liquid crystal panel 300 by region.

In this embodiment, since the backlight unit 200 is a direct type backlight unit and realizes a local dimming to operate the liquid crystal panel by region, and a contrast ratio can be improved and a power consumption can be reduced.

Further, since the reflective pattern sheet 240 including the reflective patterns 242 that are located corresponding to the respective LED packages 220 is used, a light output in a vertical direction is reduced, thus a hot spot can be prevented, and thus a display quality can be improved.

Since a light is reflected by the reflective pattern sheet 240 and travels to a side direction, an optical gap of the direct type backlight unit 200 can be reduced. Thus, a thickness of the backlight unit 200 can be reduced, and the LCD device 10 in a thin profile can be achieved. Further, because of the reduction of the optical gap, a halo defect that a light in a local dimming region undesirably enters into a neighboring local dimming region can be prevented.

The diffusion plate 250 may be configured such that a thickness (or height) of the edge region thereof decreases toward a direction to an outer side of the diffusion plate 250, e.g., an outer direction.

Accordingly, a transmittance of the edge region of the diffusion plate 250 increases toward the outer direction, and thus a dark portion at the edge region can be prevented.

Figure 3:
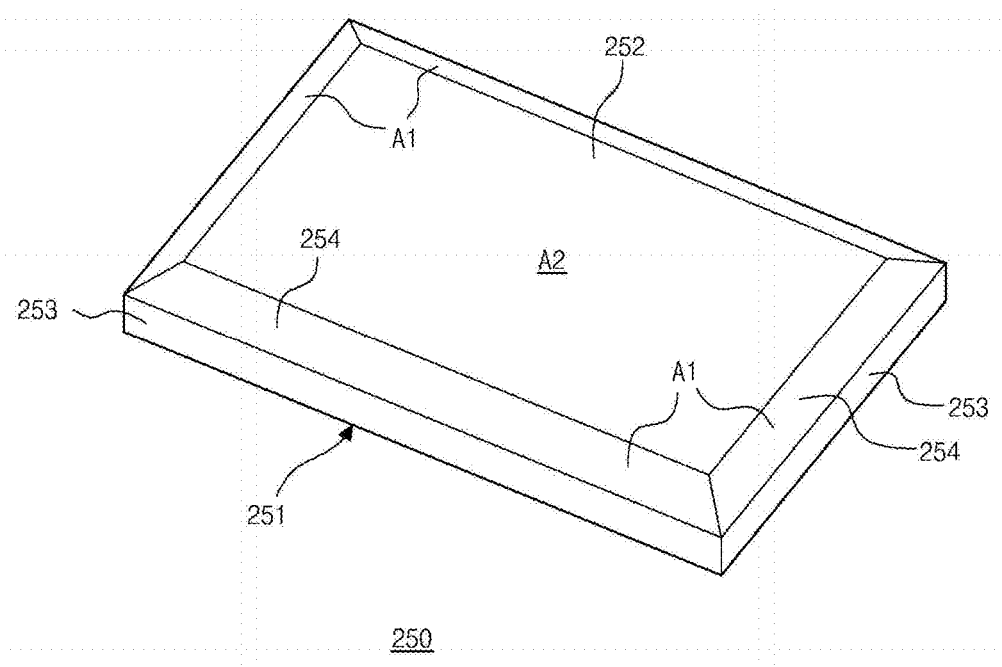
FIGS. 3 and 4 are a perspective view and a cross-sectional view, respectively, illustrating a diffusion plate according to a first embodiment of the present invention.
Figure 4:
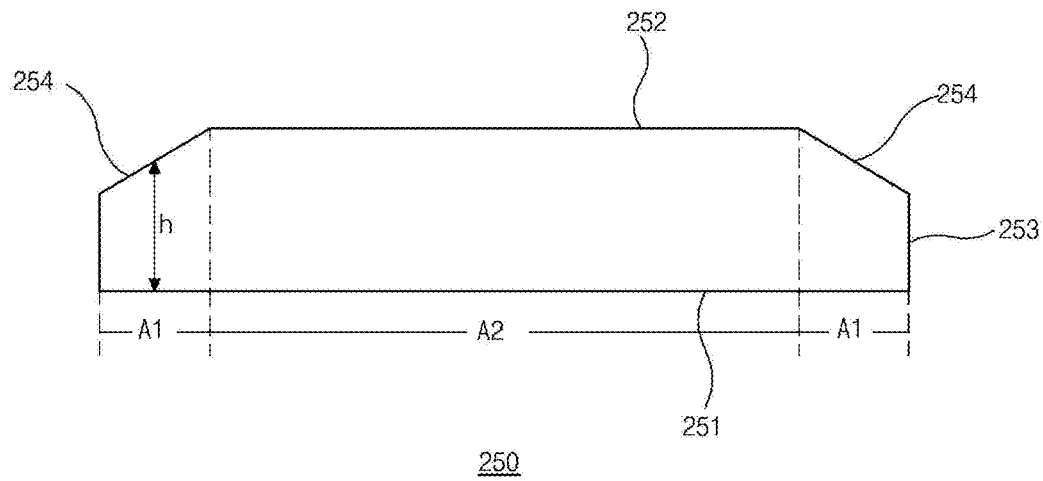

This is explained in detail further with reference to FIGS. 3 and 4. FIGS. 3 and 4 are a perspective view and a cross-sectional view, respectively, illustrating a diffusion plate according to a first embodiment of the present invention.

In a plane view, the diffusion plate 250 may include a first region A1 as an edge region which is arranged along edges (e.g., along sides and corners between sides), and a second region A2 as an inner region which is surrounded by the first region A1 and located inside the first region A1. In this embodiment, the first region A1 may be referred to as the edge portion, and the second region may be referred to as the central portion.

The diffusion plate 250 may include a bottom surface 251 facing the LED packages 220, a top surface 252 located opposite to the bottom surface 251 and facing the liquid crystal panel 300, and side surfaces 253 respectively extending upwardly from sides (or edges) of the bottom surface 251. The side surfaces 253 may extend in a direction vertical to the bottom surface 251 and/or the top surface 252.

Each of the top surface 252 and the bottom surface 251 are entirely substantially flat and are parallel to a surface of the liquid crystal panel 300.

The diffusion plate 250 may further include inclined surfaces 254 formed at the first region A1. The inclined surface 254 may extend from a corresponding side of the top surface 252, be inclined downwardly, and be connected to a corresponding side surface 253. In more detail, the inclined surfaces 254 may be formed in the first region A1 to be inclined downwardly from the sides and corners of the top surface 252.

The inclined surface 254 may have, for example, a straight line type. In other words, the inclined surface 254 may have a straight line type with a constant slope angle.

Since the inclined surface 254 is formed in the first region A1 of the edge region, the first region A1 has a shape such that a thickness (or height) h thereof becomes smaller as it is closer to the side surface 253.

In other words, with respect to the flat bottom surface 251, the inclined surface 254 of the first region A1 is configured to be inclined downwardly with the height h reduced to the outer direction.

Since the thickness h of the first region A1 decreases as being closer to the side surface 253, a transmittance (or transmission quantity) of the first region A1 increases.

Figure 5:
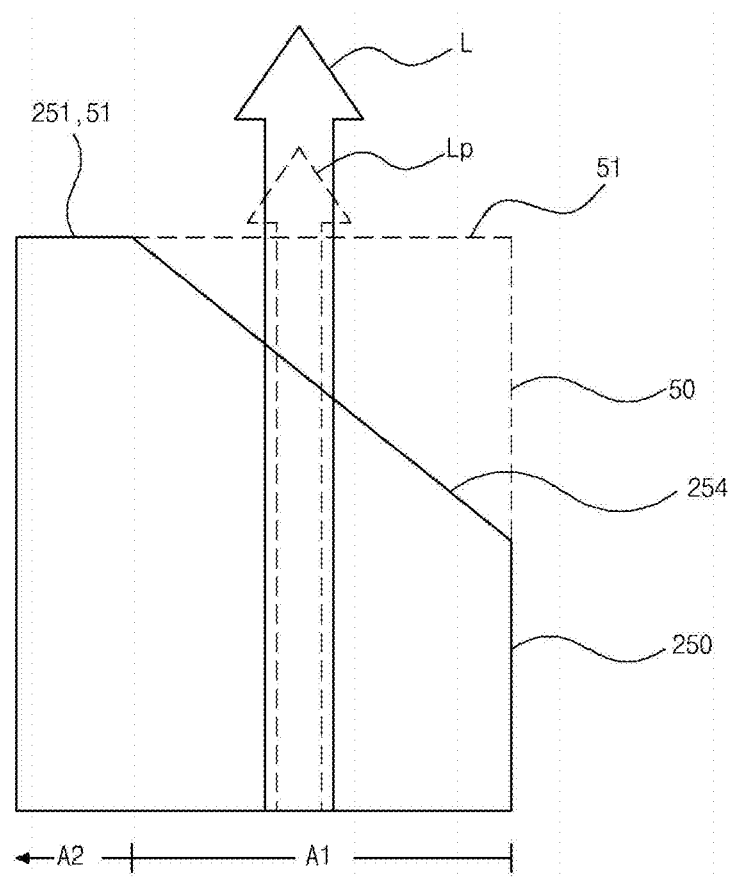
FIG. 5 is a view illustrating a transmission quantity at an edge region of each of diffusion plates according to the related art and a first embodiment of the present invention.

This refers to FIG. 5, which is a view illustrating a transmission quantity at an edge region of each of diffusion plates according to the related art and a first embodiment of the present invention.

With reference to FIG. 5, the related art diffusion plate 50 (shown by a dashed line) has a top surface 51 that are entirely flat. In other words, the top surface 51 are formed to be flat over the second region A2 and the first region A1 as well. Thus, in the related art diffusion plate 50, the first region A1 and the second region A2 have substantially the same thickness, e.g., the same height.

Accordingly, in the related art diffusion plate 50, a transmittance of the first region A1 is substantially equal to that of the second region A2. However, since the first region A1 located at a relatively outer portion has a light output quantity Lp less than that of the second region A2 located at a relatively inner portion and the light output quantity Lp decreases toward an outer direction, a dark portion where a brightness decreases toward an outer direction happens.

However, in the diffusion plate 250 of this embodiment, the first region A1 is inclined downwardly to have the inclined surface 254 that is considered substantially as a top surface in the first region A1.

Accordingly, the first region A1 decreases in thickness toward an outer direction, and thus a transmittance of the first region A1 increases toward an outer direction.

In this regard, the diffusion plate 250 has a property that a transmittance decreases as a thickness increases. In the first region A1, the diffusion plate 250 is more removed as being closer to the outside, and thus a thickness of the diffusion plate 250 decreases. Accordingly, a transmittance of the diffusion plate 250 in the first region A1 increases toward an outer direction.

Accordingly, since a transmittance of the first region A1 having the inclined structure increases toward an outer direction, a light output quantity L of the first region A1 is greater than that of the first region A1 of the related art having the flat structure.

As such, since the first region A1, e.g., the edge region is configured with the inclined structure and a transmittance is raised, a reduction of a light output quantity in the edge region can be compensated.

Accordingly, a dark portion happening at the edge region can be prevented, and a uniform brightness can be achieved.

Alternatively, the inclined surface 254 may has other shape than the above-described straight line shape.

Figure 6:
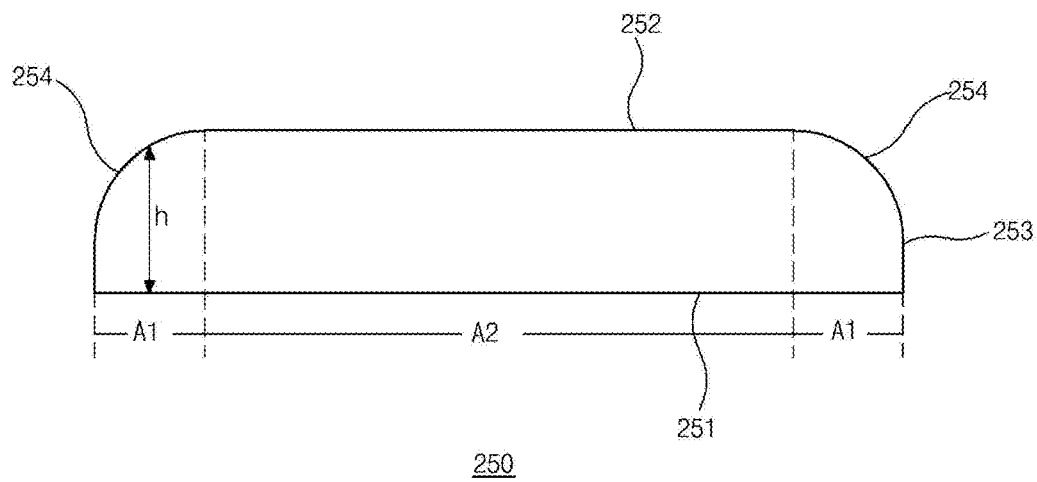
FIG. 6 is a cross-sectional view illustrating another example of a diffusion plate according to a first embodiment of the present invention.

In this regard, as shown in FIG. 6, the inclined surface 254 may have a curved line shape.

In case of the inclined surface 254 configured with the curved inclined structure, a decrease rate of thickness in the first region A1 becomes greater toward an outer direction. In the curved inclined structure, an increase rate of transmittance is not constant toward an outer direction but is gradually raised. Thus, the curved inclined structure may be efficiently applied to a display device in which a relatively great dark portion may happen.

Figure 7:
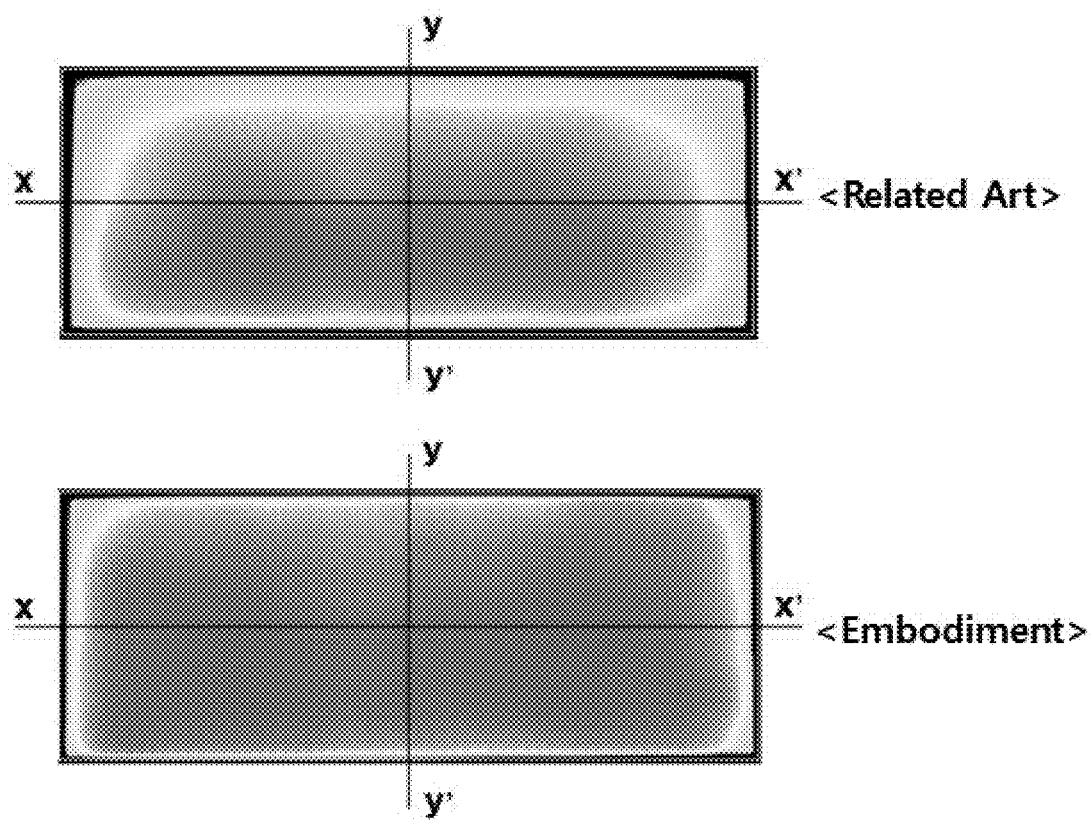
FIG. 7 is a view illustrating simulation results of front brightness profiles according to the related art and a first embodiment of the present invention.
Figure 8:
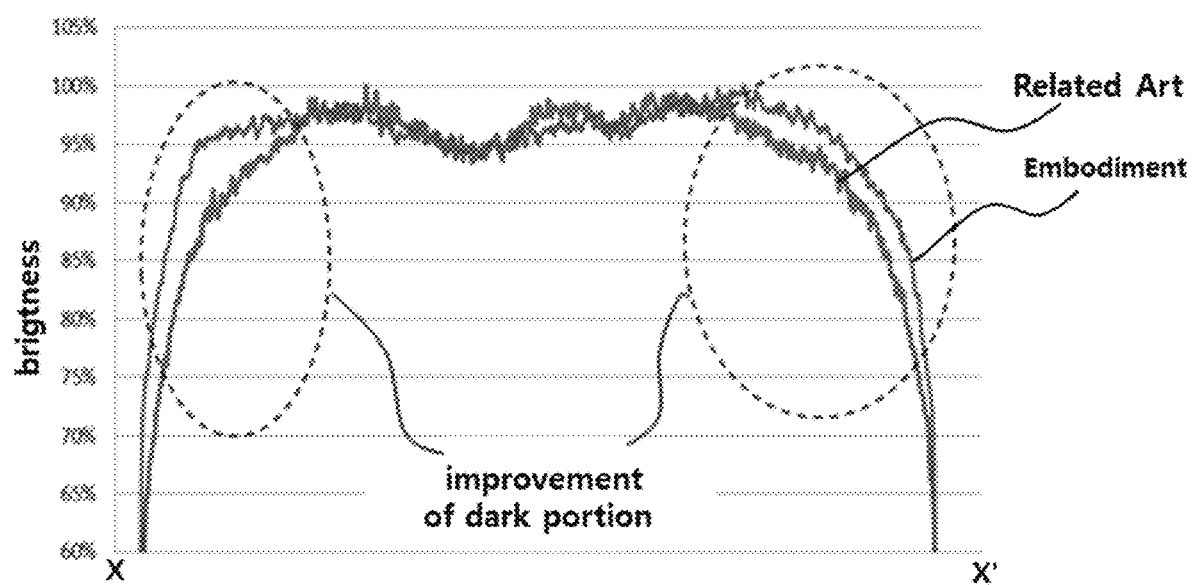
FIG. 8 is a view illustrating brightness profiles in cross-section along x-x' direction of FIG. 7.

FIG. 7 is a view illustrating simulation results of front brightness profiles according to the related art and a first embodiment of the present invention. FIG. 8 is a view illustrating brightness profiles in cross-section along x-x' direction of FIG. 7, and FIG. 9 is a view illustrating brightness profiles in cross-section along y-y' direction of FIG. 7.

Figure 9:
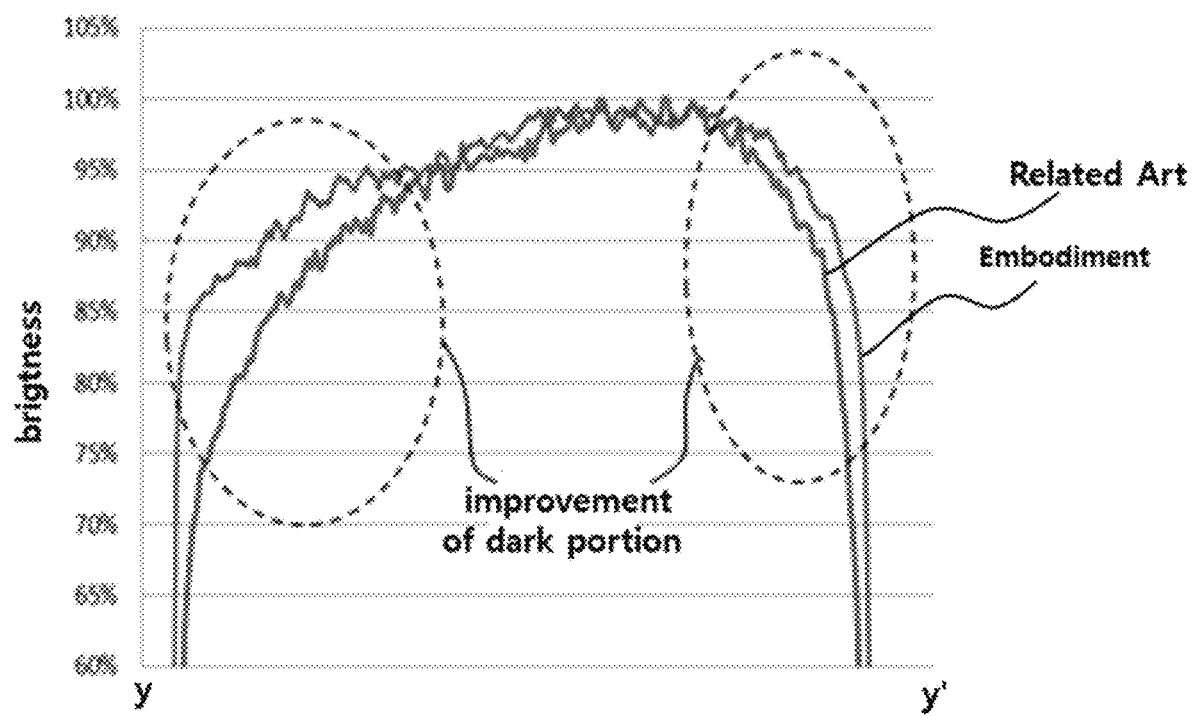
FIG. 9 is a view illustrating brightness profiles in cross-section along y-y' direction of FIG. 7.

With reference to FIGS. 7 to 9, compared with the related art with the edge region having a flat structure, in this embodiment with the edge region having an inclined structure, a brightness of the edge region increases, and a dark portion of the edge region is improved.

As described above, in this embodiment, the diffusion plate is configured with the edge region of the inclined structure.

Accordingly, a transmittance of the edge region increases, and thus a reduction of a light output can be compensated. Therefore, a dark portion at the edge region can be prevented, and a uniform brightness can be achieved.

Further, by the configuration of this embodiment, an increase of a number of LED packages is not needed, and an increase of a driving current of the LED package at the edge region is not needed and thus a power consumption can be reduced.

Second Embodiment

Figure 10:
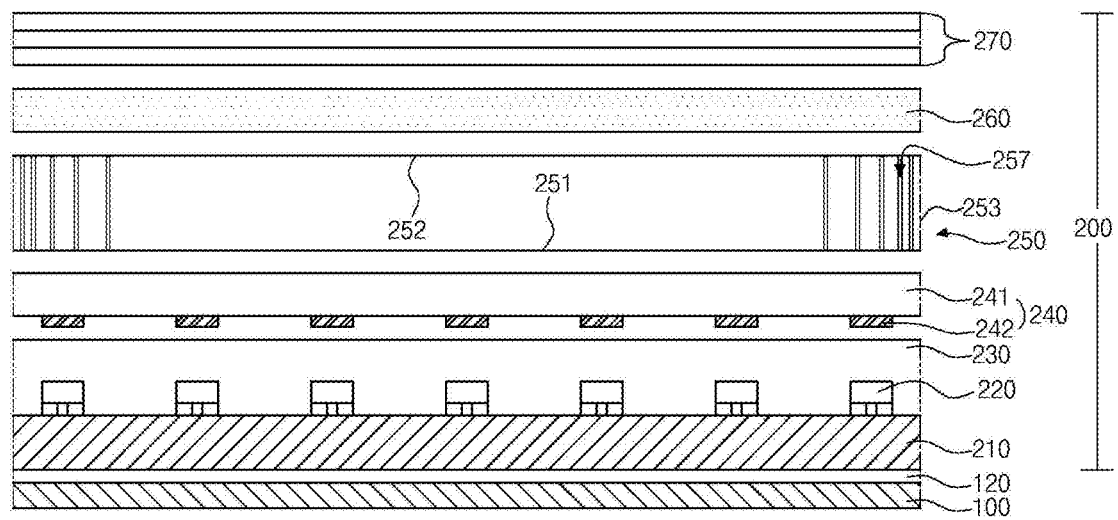
FIG. 10 is a cross-sectional view schematically illustrating a backlight unit of an LCD device according to a second embodiment of the present invention.

FIG. 10 is a cross-sectional view schematically illustrating a backlight unit of an LCD device according to a second embodiment of the present invention.

Explanations of the same or like parts of the first embodiment may be omitted.

With reference to FIG. 10, an LCD device 10 of this embodiment includes a backlight unit 200, a liquid crystal panel (300 of FIG. 1), a panel driving circuit (310 of FIG. 1), a bottom cover 100.

The bottom cover 100 is located below, and support, the backlight unit 200. The bottom cover 100 may serve as a component included in the backlight unit 200.

The backlight unit 200 may include a circuit board 210, a plurality of LED packages 220, an encapsulation layer (or encapsulation mold) 230, a reflective pattern sheet 240, a diffusion plate 250, a fluorescent sheet 260 and an optical sheet 270.

The circuit board 210 is located on a top surface of the bottom cover 100. The circuit board 210 may be attached to the bottom cover 100 through an adhesive 120 such as a double-sided adhesive tape.

The plurality of LED packages 220 are mounted on a top surface of the circuit board 210.

The LED package 220 emits a light by a driving signal supplied from a backlight driving portion.

The LED package 220 may have various structures. For example, the LED package 220 may have a lateral chip structure, flip chip structure, vertical chip structure, chip scale package (CSP) structure, or the like.

An encapsulation layer 230 may be located on, and entirely cover, a top surface of the circuit board 210 having the LED packages 220 mounted. The encapsulation layer 230 may be coated at a thickness that is greater than that of the LED package 220 to cover all LED packages 220 mounted on the circuit board 210.

The diffusion plate 250 is located on the encapsulation layer 230.

The diffusion plate 250 serves to diffuse a light from the LED packages 220 and supply a uniform plane light to the liquid crystal panel 300.

In this embodiment, the diffusion plate 250 may be configured to include edge portions (or edge regions) where a plurality of through-holes 257 are formed. Accordingly, a phenomenon that dark portions happen along edge portions of the LCD device 10 can be prevented or reduced, and thus a reduction of a uniformity of brightness caused by the dark portions can be improved.

Detailed structure and function of the diffusion plate 250 are explained later.

The reflective pattern sheet 240 may be located below the diffusion plate 250, e.g., located on a bottom surface of the diffusion plate 250. The reflective pattern sheet 240 may include a base layer 241, and a plurality of reflective patterns 242 that are formed on a bottom surface of the base layer 241 and are arranged to correspond to the plurality of LED packages 220, respectively.

The fluorescent sheet 260 may be located on the diffusion plate 250. Alternatively, the fluorescent sheet 260 may be located below the diffusion plate 250, e.g., located between the diffusion plate 250 and the encapsulation layer 230. The fluorescent sheet 260 may include at least one fluorescent substance that absorbs a part of a light of first color produced by the LED package 220 and makes at least one color that is different from the first color.

In case of using the fluorescent sheet 260, a light of the first color produced by the LED package 220 and a light of the color produced by the fluorescent sheet 260 are mixed to finally form a white light, and the white light is supplied to the liquid crystal panel 300.

For example, when the LED package 220 produces a blue light as the first color light, the fluorescent sheet 260 may absorb a part of the blue light and produce a yellow light as a second color light.

Alternatively, when the LED package 220 produces a white light, the fluorescent sheet 260 may be eliminated.

At least one optical sheet 270 including a light-concentrating sheet may be located on the fluorescent sheet 260. In this embodiment, three optical sheets 270 are shown by way of example. Alternatively, in a case that the fluorescent sheet 260 is located below the diffusion plate 250, the optical sheet 270 may be located on the diffusion plate 250.

The liquid crystal panel is located on the backlight unit 200.

The diffusion plate 250 may be configured such that the through-holes 257 are formed in a first region A1 as an edge region, and a density of the through-holes 257 increases toward an outer direction. The density of the through-holes 257 may mean a ratio of an area occupied the through-holes 257 per unit area. In this regard, the pitches between the plurality of the through-holes 257 toward the outer side direction of the diffusion plate 250 may be different with each other, and the closer the through-holes 257 to the outer side, the smaller the pitches of the through-holes 257.

Accordingly, a transmittance of the edge region of the diffusion plate 250 increases toward the outer direction, and thus a dark portion at the edge region can be prevented.

Figure 11:
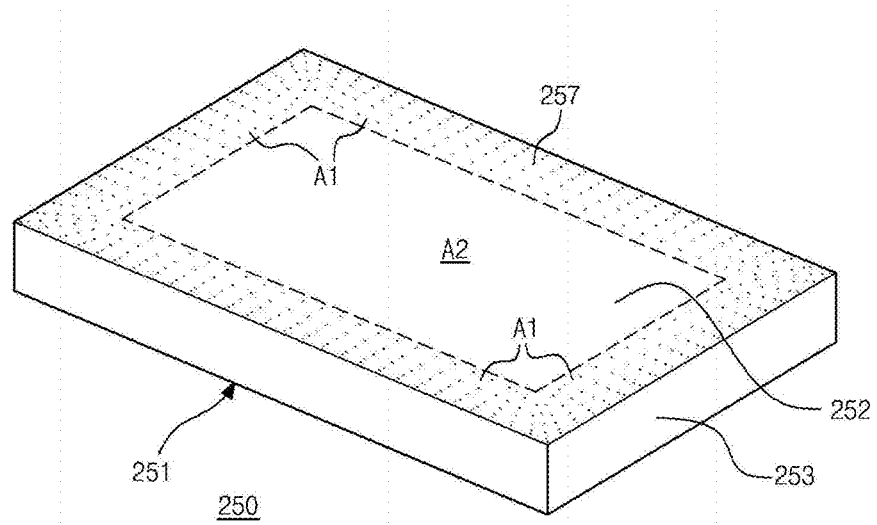
FIGS. 11 and 12 are a perspective view and a cross-sectional view, respectively, illustrating a diffusion plate according to a second embodiment of the present invention.
Figure 12:
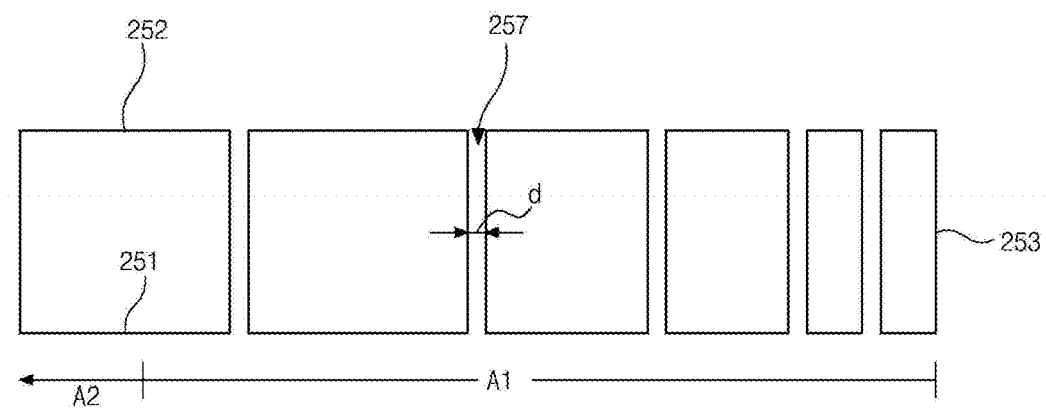

This is explained in detail further with reference to FIGS. 11 and 12. FIGS. 11 and 12 are a perspective view and a cross-sectional view, respectively, illustrating a diffusion plate according to a second embodiment of the present invention. For the purpose of explanations, FIG. 12 mostly shows the edge region of the diffusion plate 250.

In a plane view, the diffusion plate 250 may include the first region A1 as the edge region which is arranged along edges (e.g., along sides and corners between sides), and a second region A2 as an inner region which is surrounded by the first region A1 and located inside the first region A1.

The diffusion plate 250 may include a bottom surface 251 facing the LED packages 220, a top surface 252 located opposite to the bottom surface 251 and facing the liquid crystal panel 300, and side surfaces 253 respectively extending upwardly from sides (or edges) of the bottom surface 251 and connected to the top surface 252. The side surfaces 253 may extend upward in a direction vertical to bottom surface 251 and/or the top surface 252.

Each of the top surface 252 and the bottom surface 251 are entirely substantially flat and are parallel to a surface of the liquid crystal panel 300.

As such, the diffusion plate 250 entirely or substantially has a uniform thickness (or the same thickness).

In the first region A1, the through-holes 257 are arranged and passes through the diffusion plate 250 along a thickness direction.

The second region A2 may have no through-holes 257 and may entirely have a uniform optical property.

The through-holes 257 may be denser toward the side surface 253.

For example, the through-holes 257 in the first region A1 may have the same size (e.g., a width) d, and a number thereof per unit area may increase as being closer to the side surface 253.

Since the first region A1 is configured such that a density of the through-holes 257 is greater toward an outer direction, a transmittance (or transmission quantity) of the first region A1 increases in the direction toward the side surface 253.

In this regard, in a diffusion plate of the related art, no though-holes are formed in an edge region like an inner region, and the edge region located at a relatively outer portion has a light output quantity less than that of the inner region located at a relatively inner portion. Thus, the light output quantity decreases toward an outer direction, a dark portion where a brightness decreases toward an outer direction happens.

However, in the diffusion plate 250 of this embodiment, the though-holes are formed in the first region A1 as the edge region such that a density thereof increases toward an outer direction.

Accordingly, an occupancy area of the through-holes 257 in the first region A1 increases toward an outer direction, and thus a transmittance of the first region A1 increases toward an outer direction.

In this regard, in the first region A1, the diffusion plate 250 is more removed as being closer to the outside, and thus an area occupied by the diffusion plate 250 decreases. Accordingly, a transmittance of the diffusion plate 250 in the first region A1 increases toward an outer direction.

Accordingly, since a transmittance of the first region A1 having the through-hole structure increases toward an outer direction, a light output quantity of the first region A1 is greater than that of the first region of the related art having no through-hole structure.

As such, since the first region A1, e.g., the edge region is configured with the through-hole structure and a transmittance is raised, a reduction of a light output quantity in the edge region can be compensated.

Accordingly, a dark portion happening at the edge region can be prevented, and a uniform brightness can be achieved.

The density of the through-holes 257 may be varied in a configuration other than the above-described configuration of varying a number of the through-holes 257.

Figure 13:
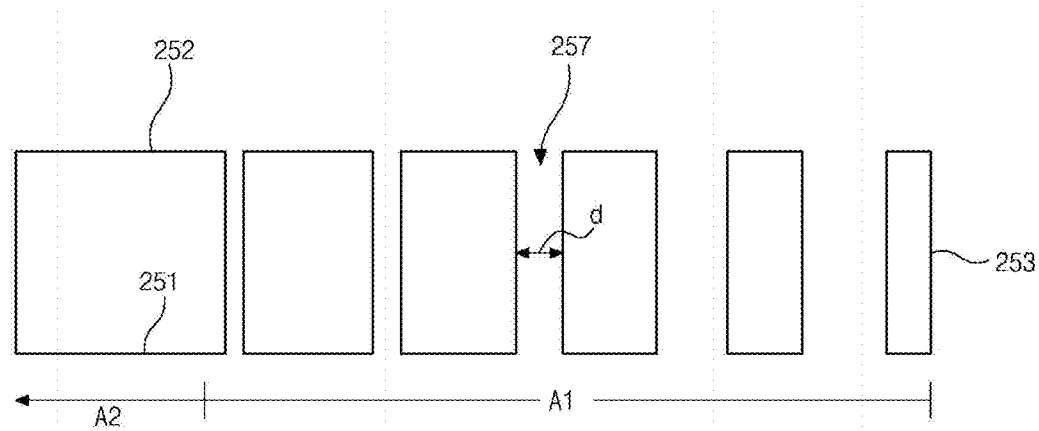
FIG. 13 is a cross-sectional view illustrating another example of a diffusion plate according to a second embodiment of the present invention.

For example, as shown in FIG. 13, the through-holes 257 may be configured such that a width d thereof is greater toward an outer direction.

Alternatively, the through-holes 257 may be configured such that a number and/or a width thereof is greater toward an outer direction.

As described above, in this embodiment, the diffusion plate is configured with the edge region of the through-hole structure.

Accordingly, a transmittance of the edge region increases, and thus a reduction of a light output can be compensated. Therefore, a dark portion at the edge region can be prevented, and a uniform brightness can be achieved.

Further, by the configuration of this embodiment, an increase of a number of LED packages is not needed, and an increase of a driving current of the LED package at the edge region is not needed and thus a power consumption can be reduced.

Further, unlimited to the above embodiments, according to embodiments of the present disclosure, a part of the first region A1 may be removed with other methods or processes such that the transmittance of the first region A1 is higher than the transmittance of the second region A2. In other words, a material constituting the first region A1 may be less than the material constituting the second region A2, such that the transmittance of the first region A1 becomes higher.

It will be apparent to those skilled in the art that various modifications and variations can be made in the backlight unit and the liquid crystal display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:
1. A backlight unit comprising:
a diffusion plate; and
a reflective pattern sheet,
wherein the diffusion plate includes a first region along edges of the diffusion plate, and a second region surrounded by the first region,
wherein the first region includes a plurality of through-holes, a density of which increases toward an outer side direction of the diffusion plate,
wherein the diffusion plate is entirely light-transmissive,
wherein the diffusion plate is located over and spaced apart from a plurality of light emitting diode (LED) packages, and
wherein the reflective pattern sheet is between the plurality of LED packages and the diffusion plate.
2. The backlight unit of claim 1, wherein a number of the through-holes increases toward the outer side direction of the diffusion plate.

3. The backlight unit of claim 1, wherein a size of the through-holes increases toward the outer side direction of the diffusion plate.
4. The backlight unit of claim 3, wherein a width of the through-holes increases toward the outer side direction of the diffusion plate.
5. The backlight unit of claim 1, further comprising:
the plurality of LED packages on a top surface of a circuit board;
an encapsulation layer located on the circuit board, and covering the plurality of LED packages;
the reflective pattern sheet located on the encapsulation layer, and including a plurality of reflective patterns respectively corresponding to the plurality of LED packages;
an optical sheet on the diffusion plate; and
a fluorescent sheet between the diffusion plate and the optical sheet or between the diffusion plate and the reflective pattern sheet.
6. The backlight unit of claim 1, wherein the second region has no through-holes.
7. A backlight unit comprising:
a diffusion plate; and
a reflective pattern sheet,
wherein the diffusion plate includes a central portion, and an edge portion surrounding the central portion,
wherein a part of the edge portion is removed such that a transmittance of the edge portion is greater than that of the central portion,
wherein the diffusion plate is entirely light-transmissive,
wherein the diffusion plate is located over and spaced apart from a plurality of light emitting diode (LED) packages, and
wherein the reflective pattern sheet is between the plurality of LED packages and the diffusion plate.
8. The backlight unit of claim 7, further comprising:
the plurality of LED packages on a top surface of a circuit board;
an encapsulation layer located on the circuit board, and covering the plurality of LED packages;
the reflective pattern sheet located on the encapsulation layer and the diffusion plate, and including a plurality of reflective patterns respectively corresponding to the plurality of LED packages;
an optical sheet on the diffusion plate; and
a fluorescent sheet between the diffusion plate and the optical sheet or between the diffusion plate and the reflective pattern sheet.
9. The backlight unit of claim 7, wherein the edge portion includes a plurality of through-holes, and the central portion has no through-holes.
10. A liquid crystal display (LCD) device, comprising:
a liquid crystal panel; and
a backlight unit below the liquid crystal panel,
the backlight unit including:
a diffusion plate including a first region along edges of the diffusion plate, and a second region surrounded by the first region, wherein the first region includes a plurality of through-holes, a density of which increases toward an outer side direction of the diffusion plate, wherein the diffusion plate is entirely light-transmissive;
a plurality of light emitting diode (LED) packages on a top surface of a circuit board;
an encapsulation layer located on the circuit board, and covering the plurality of LED packages;

a reflective pattern sheet located between the encapsulation layer and the diffusion plate, and including a plurality of reflective patterns respectively corresponding to the plurality of LED packages;

an optical sheet on the diffusion plate; and a fluorescent sheet between the diffusion plate and the optical sheet or between the diffusion plate and the reflective pattern sheet, wherein the diffusion plate is located over and spaced apart from the plurality of LED packages.

11. The LCD device of claim 10, wherein a number of the through-holes increases toward the outer side direction of the diffusion plate.

12. The LCD device of claim 10, wherein a size of the through-holes increases toward the outer side direction of the diffusion plate.

13. The LCD device of claim 12, wherein a width of the through-holes increases toward the outer side direction of the diffusion plate.

14. The LCD device of claim 10, wherein the second region has no through-holes.

15. A liquid crystal display (LCD) device, comprising:

a liquid crystal panel; and a backlight unit below the liquid crystal panel, the backlight unit including:

a diffusion plate including a central portion, and an edge portion surrounding the central portion, wherein a part of the edge portion is removed such that a transmittance of the edge portion is greater than that of the central portion, wherein the diffusion plate is entirely light-transmissive;

a plurality of light emitting diode (LED) packages on a top surface of a circuit board;

an encapsulation layer located on the circuit board, and covering the plurality of LED packages;

a reflective pattern sheet located between the encapsulation layer and the diffusion plate, and including a plurality of reflective patterns respectively corresponding to the plurality of LED packages;

an optical sheet on the diffusion plate; and a fluorescent sheet between the diffusion plate and the optical sheet or between the diffusion plate and the reflective pattern sheet, wherein the diffusion plate is located over and spaced apart from the plurality of LED packages.

16. The LCD device of claim 15, wherein the edge portion includes a plurality of through-holes, and the central portion has no through-holes.

* * * * *